United States Patent [19]
Leung et al.

[11] Patent Number: 5,134,677
[45] Date of Patent: Jul. 28, 1992

[54] FIBER-OPTIC CONNECTOR AND METHOD OF ASSEMBLY

[75] Inventors: Alexander M. C. Leung; William S. Jensen, both of Seattle, Wash.; Guido Bertoglio fu Edoardo, Lugano, Switzerland

[73] Assignee: Augat Communications Group, Seattle, Wash.

[21] Appl. No.: 672,045

[22] Filed: Mar. 18, 1991

Related U.S. Application Data

[63] Continuation-in-part of Ser. No. 656,255, Feb. 15, 1991.

[51] Int. Cl.$^5$ .............................................. G02B 6/26
[52] U.S. Cl. ........................................ 385/84; 385/81; 385/66; 385/62
[58] Field of Search ........................ 385/66, 60, 62, 78, 385/81, 84, 69, 86, 87, 70, 72, 139

[56] References Cited

U.S. PATENT DOCUMENTS

| | | | |
|---|---|---|---|
| 4,114,979 | 9/1978 | Heldte | 385/87 |
| 4,634,214 | 1/1987 | Cannon, Jr. et al. | 385/86 |
| 4,684,205 | 8/1987 | Margolin et al. | 385/68 |
| 4,743,084 | 5/1988 | Manning | 385/84 |
| 4,747,658 | 5/1988 | Borsuk et al. | 385/78 |
| 4,747,659 | 5/1988 | Takahashi | 385/67 |
| 4,762,389 | 8/1988 | Kaihara | 385/60 |
| 4,787,699 | 11/1988 | Moulin | 385/84 |
| 4,846,544 | 7/1989 | Bortolin et al. | 384/84 |
| 4,867,525 | 9/1989 | DiMarco et al. | 385/84 |
| 4,953,941 | 9/1990 | Takahashi | 385/72 |
| 4,961,624 | 10/1990 | Savitsky et al. | 385/81 |
| 4,964,690 | 10/1990 | Lappöhn et al. | 385/58 |
| 5,016,970 | 5/1991 | Nagase et al. | 385/60 |
| 5,028,115 | 7/1991 | Grosse-Boes | 385/77 |
| 5,029,966 | 7/1991 | Serapins et al. | 385/84 |
| 5,080,460 | 1/1992 | Erdman et al. | 385/81 |

OTHER PUBLICATIONS

INTEROPTICS Brochure: OPTO–LINK Singlemode Fibre Optic Connector; Produced by Diamond in Switzerland; DIN 47256; Data Sheet No. 10 004-0588 1988 by William J. Purdy Co.; INTEROPTICS, One of the Purdy Group of Companies; 2 pages.

*Primary Examiner*—Brian Healy
*Attorney, Agent, or Firm*—Weingarten, Schurgin, Gagnebin & Hayes

[57] ABSTRACT

A fiber-optic connector for a cable with an optical fiber. The connector includes a first backpost having an exteriorly threaded forward portion, a rearward portion attachable to the cable, and a central passageway extending therethrough. The connector has a body with a forward portion, an interiorly threaded rearward portion, and a central passageway extending therethrough. The body threads have a pitch diameter and pitch thread which mate with the threads of the first backpost. A second backpost is positioned within the body central passageway, and has a forward portion which holds a ferrule in position, and a rearward portion which extends through a rearward opening in the body and into a forward opening of the first backpost. The second backpost rearward portion and the first backpost central passageway are non-cylindrical to prevent rotation of the second backpost. The second backpost has an exteriorly threaded central portion with threads corresponding to the pitch diameter and thread pitch of the threads of the first backpost to allow the second backpost to threadably engage and upon rotation pass by the body interior threads when the second backpost is inserted within the body during assembly of the connector. A shoulder of the body projects radially inward sufficient to limit forward movement of the second backpost. A spring biases the second backpost in the forward direction. A coupling nut is positioned around the body and has a threaded forward end portion for threaded engagement with an adaptor. The connector is designed for easy interchange of coupling nuts having various connector styles.

15 Claims, 6 Drawing Sheets

FIBER-OPTIC CONNECTOR AND METHOD OF ASSEMBLY

CROSS-REFERENCE TO RELATED APPLICATION

This is a continuation-in-part application of copending application Ser. No. 656,255, filed Feb. 15, 1991.

TECHNICAL FIELD

The present invention relates generally to connectors, and more particularly, to connectors of the type used as terminations for a fiber-optic cable.

BACKGROUND OF THE INVENTION

Fiber-optic connectors of various styles have been employed to terminate fiber-optic cables and facilitate their connection to other fiber-optic cables. A standard fiber-optic connector specification known as DIN 47256 has been adopted by the industry, which places certain design limitations on the size and configuration of connectors built in conformance with the DIN 47256 specification. One specification requires that the coupling nut of the connector have an outside diameter of no larger than seven millimeters. The connector typically uses a ceramic or metal ferrule with an outer diameter of 2.5 millimeters.

In the past, fiber-optic connectors built according to the DIN 47256 specification did not utilize a spring-loaded ferrule arrangement. Those fiber-optic connectors that have used a spring-loaded ferrule arrangement utilized designs which are not compatible with the limitations imposed by the DIN 47256 specification.

The typical fiber-optic connector made according to the DIN 47256 specification used a rigid ferrule arrangement. Fiber-to-fiber contact is desired when two fiber-optic connectors are interconnected using a mating adaptor so that the optic fiber extending through the one ferrule and terminating at its ferrule tip will be positioned immediately adjacent to the optic fiber which extends through the other ferrule and terminates at its ferrule tip.

The conventional adaptor is exteriorly threaded along its length and has a central passageway extending fully therethrough sized to receive the ferrules of the two connectors being interconnected so that the ferrules are in substantial coaxial alignment. Each end of the adaptor has a shoulder which engages and seats against a corresponding shoulder of the connector when the connector coupling nut is fully threaded onto the adaptor. Preferably, when the coupling nuts of the two connectors are tightened onto the opposite ends of the threaded adaptor, the shoulders of the adaptor will firmly seat against the corresponding shoulders of both of the connectors with the tips of the two ferrules being in contact.

If the dimensions of the adaptor and the two connectors are not precisely matched, an undesirable optical and mechanical connection is achieved. Either the ferrule tips are not brought into contact and a space results therebetween, or the ferrule tips are in contact but the adaptor shoulders are not firmly seated against the corresponding connector shoulders.

When a space exists between the ferrule tips, and hence the two optic fibers, both insertion loss (also called "signal through loss"), and return loss (also called "signal reflected loss") are increased. These losses are reduced if the ferrule tips are brought into contact.

If the adaptor shoulders are not fully seated against the corresponding connector shoulders, a loose mechanical connection results. If the fiber-optic cable to which the connector is attached is subject to mechanical loading in a direction transverse to the axial length of the connector, the loose mechanical connector allows the ferrule to move laterally within the adaptor and thus slightly out of axial alignment with the ferrule of the other connector. When this occurs, the signal losses resulting from the misaligned ferrule tips increase, sometimes to unacceptably high levels.

These problems are substantially overcome by the use of spring-loaded ferrules, but such a design has not previously been possible while still conforming to the DIN 47256 specification.

Even existing fiber-optic connectors which do utilize spring-loaded ferrules have had their problems. As mentioned, they are bulkier than desired which increases the spacing required when positioning connectors side-by-side such as is often necessary. Another problem relates to the fact that the buffer of the cable which surrounds the optic fiber is separated from the supporting outer jacket along a long portion of its length within existing spring-loaded ferrule connectors. This often results in the bending of the buffer in the area where it is unsupported and the buckling of the optic fiber therewithin. The result of fiber buckling is increased insertion losses.

Another problem encountered in the past with fiber-optic connectors is that once the user selected a particular style of connector and installed it on a fiber-optic cable, the cable had to be cut to remove the connector if the user decided to switch to another style of connector. Presently popular connector styles, in addition to the DIN 47256 connector discussed above, include ST, FDDI, FCPC, and SC connectors.

With presently available connectors, when a user decides on a particular style connector to be initially used for the fiber-optic cables in a system, the user is locked into that connector design permanently unless the user is willing to detach all of the connectors from the cables and replace them with entirely new connectors. Such a changeover involves great cost. This cost involves not only the purchase of replacement connectors, but also the time involved in removing the old connectors, preparing the fiber-optic cable ends for the new connectors, installing the new connectors on the cable ends, and system downtime during the re-termination process. Nevertheless, this cost must frequently be incurred because the style connector initially chosen for a system is determined not to be the style of connector desired later.

Another problem encountered with presently available fiber-optic connectors is that during initial installation the connector has to be disassembled for reliable insertion of the fiber-optic cable into the connector to position the optic fiber in the connector's ferrule. This is particularly true for some connectors which utilize spring-loaded ferrules.

Yet another problem encountered with presently available fiber-optic connectors is that certain internal parts of the connector can rotate relative to each other upon assembly of the connector which sometimes results in scoring or nicking of the optic fiber or twisting the buffered optic fiber. If the optic fiber is so damaged, unacceptable transmission losses result.

It will therefore be appreciated that there has long been a significant need for a compact, fiber-optic connector manufacturable in accordance with the DIN 47256 specification which utilizes a spring-loaded ferrule, but yet avoids the fiber buckling problems experienced with other connectors using spring-loaded ferrules. There has also been a significant need for a universal fiber-optic connector which can be easily converted from one connector style to another without detaching the fiber-optic cable from the connector. Further, there exists a need for a fiber-optic connector which allows the optic fiber to be reliably inserted into the connector during initial installation of the connector on the cable without disassembly of the connector. The connector should also avoid the rotation of parts which can result in damage to the optic fiber upon assembly of the connector. The present invention fulfills these needs and further provides other related advantages.

SUMMARY OF THE INVENTION

The present invention resides in a fiber-optic connector for a cable with an optic fiber. The connector includes a ferrule having a central passageway extending generally longitudinally fully through the ferrule to receive the optic fiber. The connector further includes an elongated first backpost having a forward end portion, a rearward end portion attachable to the cable, and a central passageway extending generally longitudinally fully through the first backpost to receive the optic fiber. In the preferred embodiment of the invention, the first backpost forward end portion has an exteriorly threaded portion with threads having a first pitch diameter and a first thread pitch. The first backpost central passageway has a forward opening at the first backpost forward portion.

The connector further includes a body having a forward end portion, a rearward end portion, and a central passageway extending generally longitudinally fully through the body. In the preferred embodiment of the invention, the body rearward end portion has an interiorly threaded portion with threads having the first thread pitch diameter, the first thread pitch and an interior thread diameter. The first backpost exteriorly threaded portion is threadably received by the body interiorly threaded portion to hold the body and the first backpost in substantial coaxial alignment. The body central passageway has a forward opening at the body forward portion defined by a shoulder which projects radially inward and a rearward opening at the body rearward portion.

The connector also includes an elongated second backpost positioned within the body central passageway and having forward and rearward end portions. In one embodiment the forward end portion extends forwardly through the body forward opening. The rearward end portion extending rearwardly through the body rearward opening and into the first backpost forward opening. The second backpost forward portion engages and holds the ferrule in generally longitudinal alignment with the second backpost.

The second backpost forward portion is disposed within the body central passageway for longitudinal movement. In the preferred embodiment, the second backpost forward portion has an outer diameter generally equal to or less than the interior thread diameter to freely pass by the body interior threads when the second backpost is inserted within the body central passageway during assembly of the connector. The second backpost rearward portion is disposed within the first backpost central passageway for longitudinal movement. The first backpost central passageway and the body central passageway have a combined longitudinal length to permit forward and rearward longitudinal movement of the second backpost therewithin.

The second backpost further has an exteriorly threaded central portion positioned between the second backpost forward and rearward portions. The second backpost exteriorly threaded portion has threads with the first pitch diameter and the first thread pitch to allow the second post exterior threads to threadably engage and upon rotation pass by the body interior threads when the second backpost is inserted within the body central passageway during assembly of the connector prior to the body interiorly threaded portion threadably receiving the first backpost exteriorly threaded portion.

The body shoulder projects radially inward sufficient to limit forward longitudinal movement of the second backpost within the first backpost and body central passageways.

The second backpost further has a central passageway extending generally longitudinally fully through the second backpost to receive the optic fiber. The second backpost is maintained within the body in substantial coaxial alignment with the first backpost, with the first backpost central passageway and the second backpost central passageway in substantial coaxial alignment.

A spring is positioned within the body about the second backpost rearward portion and between the first backpost forward portion and the second backpost central portion to bias the second backpost forwardly relative to the first backpost.

The connector further includes a coupling member mounted to the body. In one embodiment, the coupling member is a coupling nut having a threaded forward end portion, a rearward end portion and a central passageway extending generally longitudinally fully through the nut. The nut central passageway receives the body therewithin with the ferrule extending forward through a forward opening of the nut and the first backpost extending rearwardly through a rearward opening of the nut. The nut is freely rotatable relative to the body and the backpost.

In one embodiment of the invention, the body shoulder projects radially inward to slidably contact the second backpost forward portion and support the second backpost against lateral forces applied thereto during use of the connector.

Another aspect of the present invention has the first backpost central passageway provided with a non-cylindrical interior wall portion positioned toward the first backpost forward opening, and the second backpost rearward portion provided with a non-cylindrical exterior wall portion which extends within and mates with the first backpost non-cylindrical wall portion. This permits longitudinal movement of the second backpost relative to the first backpost while preventing rotational movement therebetween. The second backpost rearward end portion has sufficient length to position the second backpost non-cylindrical exterior wall portion within the first backpost non-cylindrical interior wall portion to prevent rotational movement therebetween prior to and when the body interiorly threaded rearward portion is being threaded onto the first backpost exteriorly threaded portion during assembly of the connector.

Yet another aspect of the invention involves the first backpost central passageway having a rearward passageway portion which extends forward from a rearward end of the first backpost to a midportion of the first backpost passageway and a forward passageway portion which extends rearward from a forward end of the first backpost to the midportion. The rearward passageway portion has a diameter sized to receive and provide lateral support to the optic fiber. The forward passageway portion has a diameter larger than the diameter of the rearward passageway portion and is sized to receive and permit longitudinal movement of the second backpost rearward portion therein. The forward passageway portion has a longitudinal length sized substantially equal to the length necessary for movement of the second backpost rearward portion to permit the desired compression of the spring which results from rearward movement of the second backpost during usage of the connector. In the preferred embodiment, a rearward end of the second backpost rearward portion is spaced from an interior shoulder of the first backpost central passageway by a distance equal to or less than five times the outside diameter of the buffered optic fiber positioned therein when the connector is assembled and the spring biases the second backpost is biased fully forward by the spring.

According to another aspect of the invention, the connector is constructed as a universal connector which can be easily and quickly converted among a plurality of connector styles. An inventive method of assembling the fiber-optic cable is set forth which allows a fiber-optic connector of one style to be initially assembled on the cable, and after it is desired to change to a selected different style selected from a plurality of additional available styles, the user simply disconnects the initially installed coupling member and body from the assembled connector, and then connects the selected different style coupling member and corresponding body to the connector without removing the first backpost, the second backpost, the spring or the ferrule, and without requiring the removal of the optic fiber which is fixedly secured within at least the ferrule central passageway.

Other features and advantages of the invention will become apparent from the following detailed description, taken in conjunction with the accompanying drawings.

DETAILED DESCRIPTION OF THE INVENTION

Figure 1:
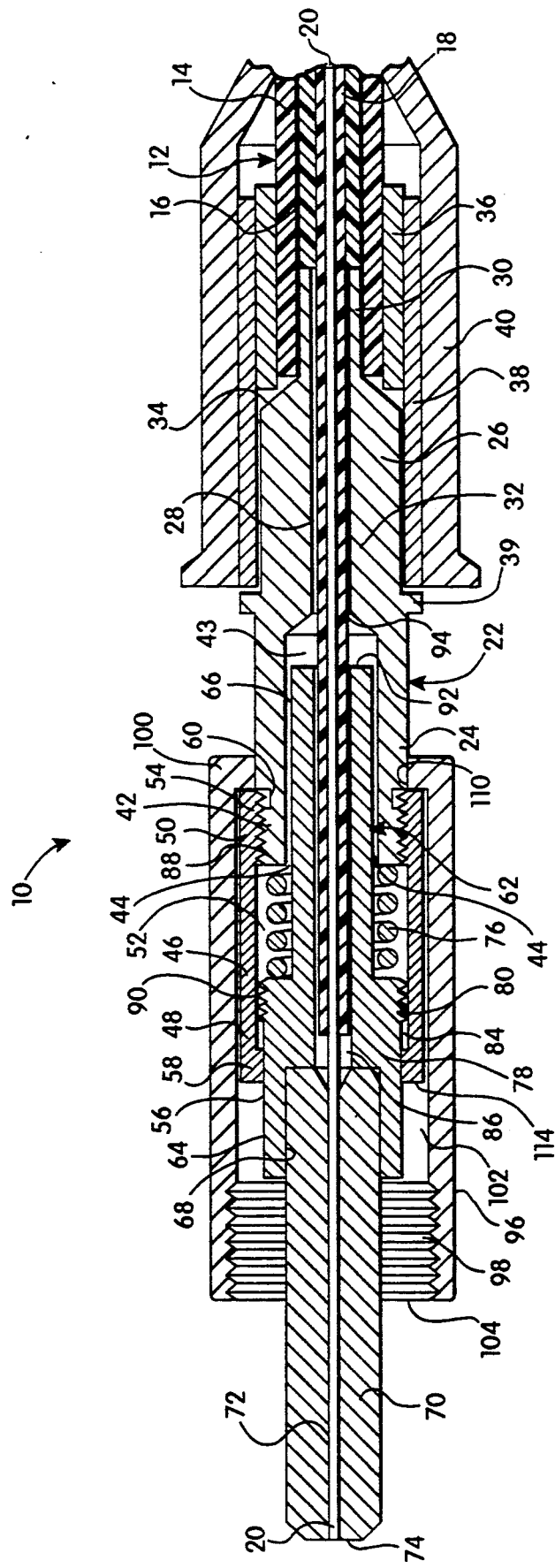
FIG. 1 is a side elevational, sectional view of a DIN 47256-style fiber-optic connector embodying the present invention.

As shown in the drawings for purposes of illustration, the present invention is embodied in a fiber-optic connector 10 used for termination of a fiber-optic cable 12. A conventional cable is illustrated in FIG. 1 as having a PVC outer jacket 14, a Kevlar inner sleeve 16, a nylon buffer sheath 18 within the Kevlar inner sleeve, and a centrally disposed silica optic fiber 20 disposed within the buffer sheath, all in generally coaxial arrangement. The buffer sheath 18 cushions and protects the optic fiber 20, and the outer jacket 14 provides rigidity and strength against bending to avoid buckling of the optic fiber. It is to be understood that as used herein, a "cable" is intended to include a buffered optic fiber having only a buffer sheath 18 without any outer jacket or inner sleeve.

The fiber-optic connector 10 has an elongated first backpost 22 with an exteriorly threaded forward end portion 24 and a rearward end portion 26 attachable to the fiber-optic cable 12. The first backpost 22 also includes a central passageway 28 which extends longitudinally fully through the first backpost. In the presently preferred embodiment of the invention, the first backpost 22 is manufactured as a single piece, but in alternative embodiments the forward and rearward portions 24 and 26 can be manufactured as separate pieces threadably connected together.

To prepare the cable 12 for attachment to the connector 10, the free end of the cable is stripped of an appropriate lengthwise portion of its PVC outer jacket 14, a shorter lengthwise portion of its Kevlar inner sleeve 16 and a yet shorter lengthwise portion of its buffer sheath 18. The free end portion of the buffer sheath 18 and optic fiber 20 with the outer jacket 14 and the inner sleeve 16 removed is inserted into the first backpost central passageway 28, and a reduced diameter, thinwall end portion 30 of the first backpost rearward portion 26 is inserted between the buffer sheath 18 and the inner sleeve 16. Further insertion of the first backpost 22 into the cable causes the free end portion of the inner sleeve 16 with the outer jacket 14 removed to engage a larger diameter, thick-wall portion 32 of the first backpost rearward portion 26 and to expand thereabout. The first backpost 22 is inserted until the free end of the outer jacket 14 is brought into position against a stop wall 34 at the transition between the reduced diameter end portion 30 and the large diameter end portion 32 of the first backpost rearward portion 26.

Inner and outer crimp sleeves 36 and 38, respectively, which have been positioned on the cable 12 before the first backpost 22 is inserted, are then moved into position for crimping. The inner crimp sleeve 36 surrounds the outer jacket 14 with the reduced diameter end portion 30 of the first backpost rearward portion 26 therewithin. The outer crimp sleeve 38 surrounds the inner crimp sleeve 36 and extends forwardly to surround the large diameter end portion 32 of the first backpost rearward portion 26 therewithin against a stop 39. The inner and outer crimp sleeves 36 and 38 are then crimped to firmly connect the first backpost 22 to the free end portion of the cable 12. A boot 40 is now positioned over the outer crimp sleeve 38 and extends rearwardly to surround a portion of the cable 12 adjacent to the connector 10.

In the presently preferred embodiment of the invention, the exteriorly threaded forward end portion 24 of the first backpost 22 has threads 42 with a first pitch diameter of 4.0 millimeters and a first thread pitch of 0.35 millimeters. As used herein, "pitch diameter" is the major thread diameter, or in other words, the distance between the outwardly projecting peaks of exterior threads, and the distance between the valleys of interior threads. The first backpost central passageway 28 interior of the forward portion 24 has a portion 43 with a diameter enlarged beyond that necessary to carry the buffer sheath 18 and optic fiber 20, and has a forward opening 44.

The fiber-optic connector 10 further includes a cylindrical body 46 having a forward end portion 48, an interiorly threaded rearward end portion 50, and a central passageway 52 extending generally longitudinally fully through the body. The body 46 shown in FIGS. 1 and 2 has a design for use in a DIN 47256 style connector. The body interiorly threaded portion 50 has threads 54 with the same pitch diameter and thread pitch as the first backpost threads 42. The threads 54 have an interior thread diameter, or minor thread diameter, measured as the distance between the inwardly projecting peaks of the threads 54. As will be described below, the size of this interior thread controls the sizing of another component. The first backpost exteriorly threaded forward portion 24 is threadably received by the body interiorly threaded rearward portion 50, by the mating of threads 42 and 54 thereof, to hold the body 46 and the first backpost 22 in substantial coaxial alignment.

The body central passageway 52 has a forward opening 56 at the body forward portion 48 defined by a shoulder 58 which projects radially inward. The body central passageway 52 also has a rearward opening 60 at the body rearward portion 50 adjacent to which the threads 54 are formed.

The fiber-optic connector 10 has an elongated second backpost 62 positioned within the body central passageway 52, with a forward end portion 64 extending forwardly through the body forward opening 56 and a rearward portion 66 extending rearwardly through the body rearward opening 60 and into the first backpost forward opening 44.

The second backpost forward portion 64 terminates in a forwardly opening recess 68 sized to receive and hold a ferrule 70 in generally longitudinal alignment with the second backpost 62. The ferrule 70 has a central passageway 72 extending longitudinally fully through the ferrule and receives the free end portion of the optic fiber 20 with the buffer sheath 18, the inner sleeve 16, and the outer jacket 14 removed. The optic fiber 20 is generally glued within the ferrule central passageway 72 with the optic fiber terminating at a forward tip 74 of the ferrule 70. The end of the optic fiber 20 at the ferrule tip 74 is polished to improve light transmission. The ferrule 70 may be made of ceramic, metal or any other suitable material.

The second backpost forward portion 64 is disposed within the body forward opening 56 for longitudinal movement and has an outer dimension generally equal to or less than the interior thread diameter of the interior body threads 54 so that it can freely pass by the body threads when the second backpost 62 is inserted within the body central passageway 52 during assembly of the connection 10.

Figure 2:
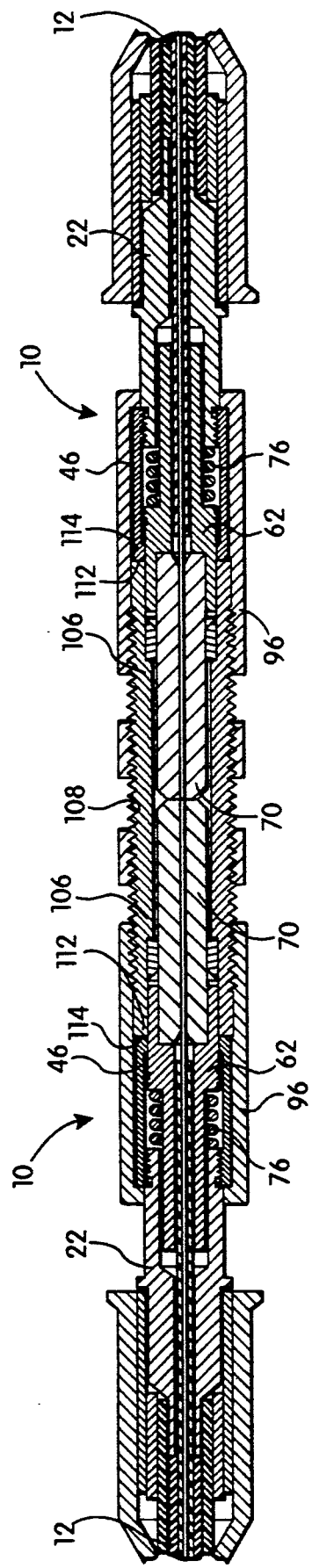
FIG. 2 is a reduced-scale side elevational, sectional view of two fiber-optic connectors embodying the present invention connected together using an adaptor.

The second backpost rearward portion 66 is disposed within the enlarged diameter portion 43 of the first backpost central passageway 28 for longitudinal movement. The enlarged diameter portion 43 of the first backpost central passageway 28 and the body central passageway 52 have a combined longitudinal length to permit forward and rearward longitudinal movement of the second backpost therewithin, at least within a limited range of movement, which in the presently preferred embodiment of the invention is 1.0 millimeters or less. As will be described in more detail below, this longitudinal movement is to permit the tip 74 of the ferrule 70 to engage and be rearwardly displaced by the tip of another connector's ferrule when two fiber-optic cables are connected together, such as shown in FIG. 2. A spring 76 provides a forward biasing force on the second backpost 62.

The second backpost 62 further has an exteriorly threaded central portion 78 positioned between the second backpost forward and rearward portions 64 and 66. The second backpost exteriorly threaded portion 78 has threads 80 with the same pitch diameter and thread pitch as the first backpost threads 42. This allows the second exterior backpost threads 80 to threadably engage and upon rotation pass by the interior body threads 54 when the second backpost 62 is inserted within the body central passageway 52 during assembly of the connector 10 prior to the body interiorly threaded portion 50 threadably receiving the first backpost exteriorly threaded portion 24.

In the presently preferred embodiment of the invention, the body shoulder 58 projects radially inward a sufficient distance to contact a forward end portion 84 of the second backpost threads 80 when the second backpost 62 moves sufficiently forward under the urging of the spring 76, and thereby limit forward longitudinal movement of the second backpost within the first backpost and body central passageways 28 and 52. This prevents the second backpost 62 separating from the connector 10 during handling, and also provides a forward limit to the movement of the second backpost caused by the spring 76 bearing thereon.

The second backpost 62 further has a central passageway 86 extending generally longitudinally fully through the second backpost to receive the free end portion of the optic fiber 20 and the buffer sheath 18 therein with the inner sleeve 16 and outer jacket 14 removed. The optic fiber 20 and the buffer sheath 18 are generally glued within the second backpost central passageway 86. The second backpost central passageway 86 preferably has a diameter equal to or less than 2.0 times the diameter of the buffer sheath 18. The second backpost 62 is maintained within the body 46 in substantial coaxial alignment with the first backpost 22, so that the first backpost central passageway 28 and the second backpost central passageway 86 are in substantial coaxial alignment.

The spring 76 is positioned within the body central passageway 52 the second backpost rearward portion 66. The spring 76 is longitudinally located between a forward end wall 88 of the first backpost forward portion 24 and a rearward end wall 90 of the second backpost central portion 78 to bias the second backpost 62 forwardly relative to the first backpost 22. The second backpost 62 is illustrated in FIG. 1 in a midposition with the spring 76 partially compressed as it would be in use if the tip 74 of the ferrule 70 was in engagement with another ferrule (as shown in FIG. 2).

To permit longitudinal movement of the second backpost 62, the second backpost has a length which places a rearward end 92 of the second backpost rearward portion 66 at a suitable distance forward of a rearward end wall 94 of the enlarged diameter portion 43 of the first backpost central passageway 28. This spacing has the minimum length possible in the preferred embodiment of the invention so as to limit the length of the cable 12 within the connector 10 which is unsupported by either the outer jacket 14 or one of the internal components of the connector. This minimizes the chance of the optic fiber 20 and the buffer sheath 18 buckling, along their length where all but the buffer sheath has been removed from the optic fiber, as a result of longitudinal movement of the second backpost 62. The spacing in the presently preferred embodiment is equal to or less than 5 times the diameter of the buffer sheath 18.

Preferably, the spacing is no larger than necessary to permit the longitudinal movement of the second backpost rearward portion 66 within the enlarged diameter portion 43 of the first backpost central passageway 28 which occurs when the spring 76 is compressed as a result of rearward movement of the second backpost 62 during usage of the connector 10.

An additional benefit of minimizing this spacing is that with the connector 10 of the present invention, the optic fiber 20 can be inserted within the fully assembled connector during initial installation on the cable 12 and will reliably transverse the space between the reduced diameter rearward portion of the first backpost central passageway 28 and the rearward end 92 of the second backpost 62 and enter the second backpost central passageway 86. This avoids the need to disassemble the second backpost 62 to visually locate and manually insert the end of the optic fiber in the opening in the rearward end 92 of the second backpost. Unlike with some prior art spring-loaded connectors when attempting to insert the optic fiber into the assembled connector, the optic fiber 20 does not catch within the connector and prevent it from passing fully therethrough into the ferrule central passageway 72. This produces a great savings in time during initial installation, since the connector can be attached to the fiber-optic cable 12 in a pre-assembled condition.

The fiber-optic connector 10 as shown in FIGS. 1 and 2 further includes a coupling nut 96 constructed as a DIN 47256-style connector. The nut 96 has an interiorly threaded forward end portion 98 and a rearward end portion 100, and has a central passageway 102 which extends longitudinally fully through the nut to receive the body 46 therewithin. The ferrule 70 extends forwardly through a forward opening 104 of the nut 96 which is sized to receive a correspondingly threaded end portion 106 of an adaptor 108 (see FIG. 2), as will described below. The first backpost 22 extends rearwardly through a rearward opening 110 of the nut 96. The nut 96 is rotatably mounted on the body 46 and the first backpost 22 for free rotation relative thereto when tightening the nut to the threaded end portion of the adaptor 108. The nut 96 is fit and functionally compatible with other standard DIN 47256-style connectors.

When the nut 96 is fully threaded onto the adaptor 108, a shoulder 112 of the adaptor is brought into firm seated engagement with a forward end wall 114 of the body forward portion 48, as best illustrated in FIG. 2. This provides a solid mechanical connection between the connector 10 and the adaptor 108 which maintains the ferrule 70 in proper axial alignment even when large mechanical loads are applied to the cable 12 in a transverse direction. This solid mechanical connection can be achieved while insuring that the two fiber-optic connectors 10 being connected together using the adaptor 108 have the tips 74 of their ferrules 70 in contact.

Even if the ferrules 70 of the two connectors 10 engage each other before the body end walls 114 of the two connectors are fully seated against the adaptor shoulders 112, the ferrules will move rearwardly against the forward urgings of the connector springs 76 by a sufficient distance to allow the nuts 96 to bring the body end walls 114 into firm sealed engagement with the adaptor shoulders 112. In the present embodiment, the combined movement of the ferrules 70 of the two connectors 10 is 2.0 millimeters or less. It is noted that the ferrule 70 on the right side of the adaptor 108 in FIG. 2 is shown as being manufactured of ceramic, and the ferrule on the left side is shown as being manufactured of metal.

The fiber-optic connector 10 of the present invention provides a compact, spring-load ferrule design which mechanically isolated the ferrule 70 from the remainder of the connector components. The compact design allows the connector to be constructed within the size and other limitations of the DIN 47256 specification. The connector 10 has fewer parts than most other spring-loaded ferrule connectors, and the design facilitates preassembly of the connector components.

The design of the fiber-optic connector 10 of the present invention also allows it to function as a universal fiber-optic connector. The body 46 and the coupling nut 96 mounted thereon can be quickly and easily removed, and replaced with another body on which is mounted a coupling nut having an alternative connector style. Removal of the body 46 is accomplished simply by rotating the body relative to the first backpost 22, to unscrew the body interiorly threaded portion 50 from the first backpost exteriorly threaded forward portion 24. The body 46 can then be moved forward and separated from the first backpost 22. The body 46 must then be disconnected from the second backpost 62 which is fixedly secured to the cable 12. This is accomplished by moving the body 46 forward until the body interiorly threaded portion 50 threadably engages the second backpost exteriorly threaded portion 78, and then rotating the body relative to the second backpost 62 until separated. The body 46 and the nut 96 mounted thereon can then be moved forward free of the second backpost 62 and the ferrule 70 which it supports.

It is noted that upon initial installation of the connector 10, the optic fiber 20 is generally glued in place within the ferrule central passageway 72 and the second backpost central passageway 86. Thus, the ferrule 70, the second backpost 62 and the first backpost 22 cannot be removed from the fiber-optic cable 12 unless the connector 10 is cut off of the fiber-optic cable 12. One aspect of the present invention is to provide a universal connector which has many common parts which form a connector base assembly and are fixedly secured to the fiber-optic cable 12, while allowing the body 46 and the nut 96 mounted thereon to be easily and quickly removed for replacement with another body and nut having an alternative-style connector.

Figure 3:
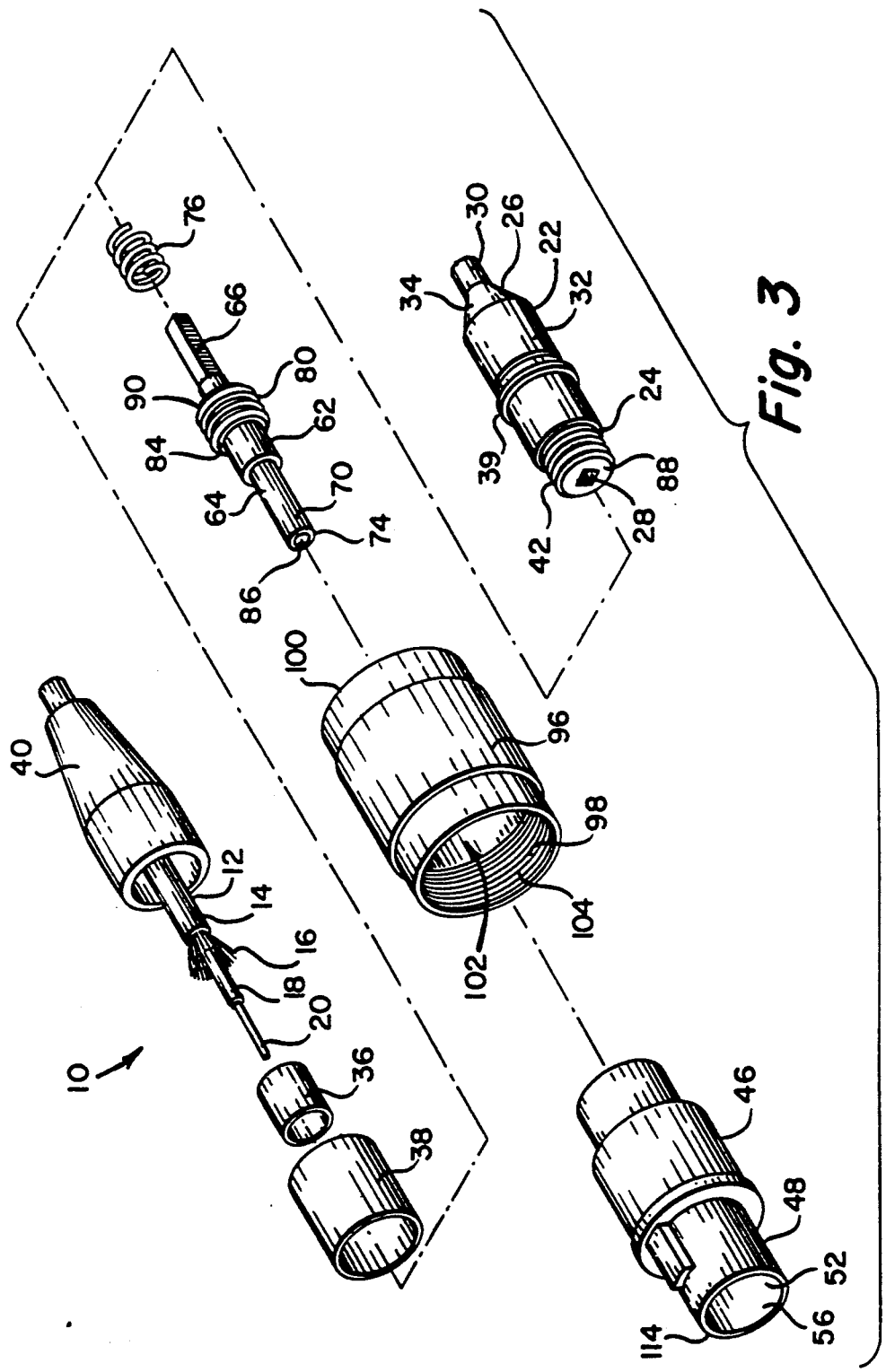
FIG. 3 is an exploded, isometric view of a fiber-optic connector having the same design as the connector of FIG. 1, except for the use of an FCPC style connector body and coupling nut.
Figure 4:
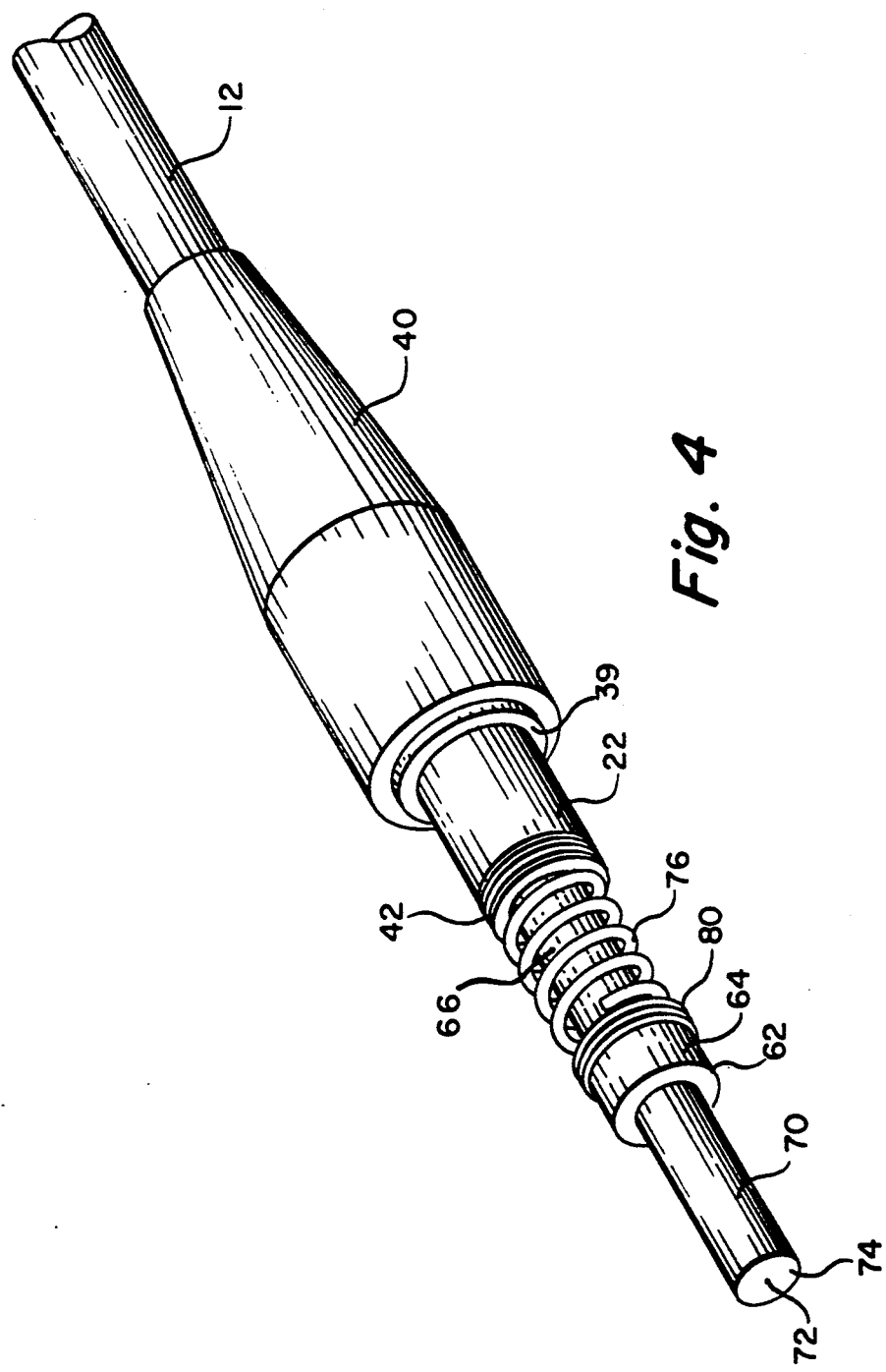
FIG. 4 is an enlarged-scale, isometric view of the connector base assembly used with the connectors shown in FIGS. 1 and 3 with the body and coupling nut removed.

As described above, FIGS. 1 and 2 show the connector 10 with a body 46 and coupling nut 96 having a DIN 47256 connector style. FIG. 3 shows in exploded view the same connector base assembly, but with the body 46 and the nut 96 having an FCPC connector style which is fit and functionally compatible with other standard FCPC-style connectors. If the connector 10 shown in FIG. 1 having the DIN 47256 connector style is installed on the fiber-optic cable 12, and the user subsequently decides to convert to an FCPC connector style, all the user need do is to remove the initially installed body 46 and nut 96 with the DIN 47256 connector style and replace them with the body and nut shown in FIG. 3 having the FCPC connector style. Once the initially installed body 46 and nut 96 are removed as described above, the FCPC connector style body with the nut mounted thereon are simply screwed into place. This is done using the reverse of the removal procedure described above. The body 46 with the selected different connector style is rotated to screw the body interiorly threaded portion 50 onto the second backpost exteriorly threaded portion 78. After the second backpost exteriorly threaded portion 78 is moved past the body threads 54, the second backpost 62 has its exteriorly threaded portion 78 captured within the body 46 between the body shoulder 58 and the body threads 54. The body 46 is then moved rearward to engage the body interiorly threaded portion 50 with the first backpost exteriorly threaded portion 24 and the body is rotated to screw the body onto the first backpost. During the removal and reassembly procedures, the connector base assembly stays fixedly secured in place on the fiber-optic cable 12 and the optic fiber 20 remains glued in place within the ferrule 70 and the second backpost 62.

Figure 5:
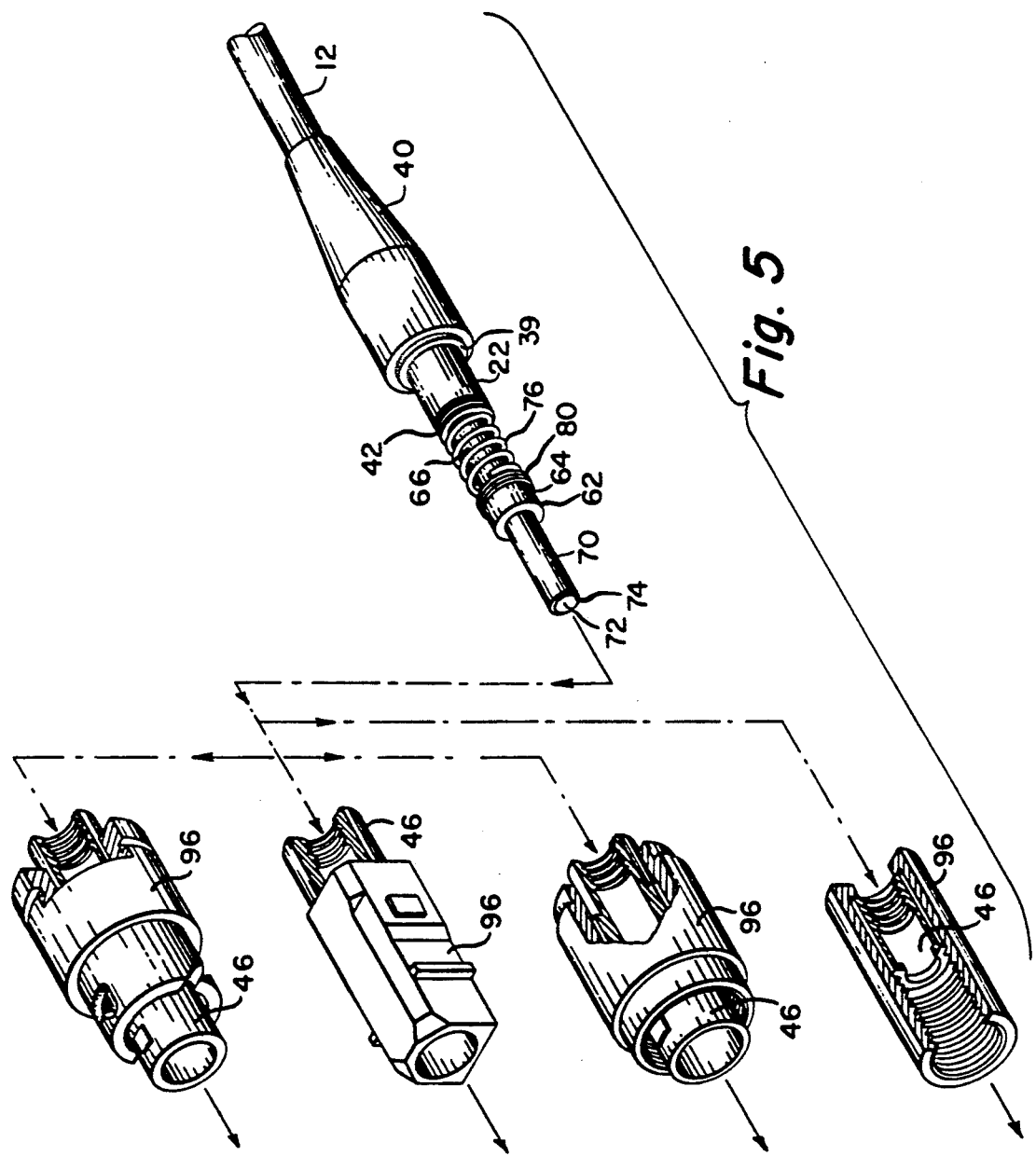
FIG. 5 is a reduced-scale, isometric view of the connector base assembly shown in FIG. 4, with four alternative-style coupling nuts and corresponding bodies shown disconnected from the base assembly.
Figure 6:
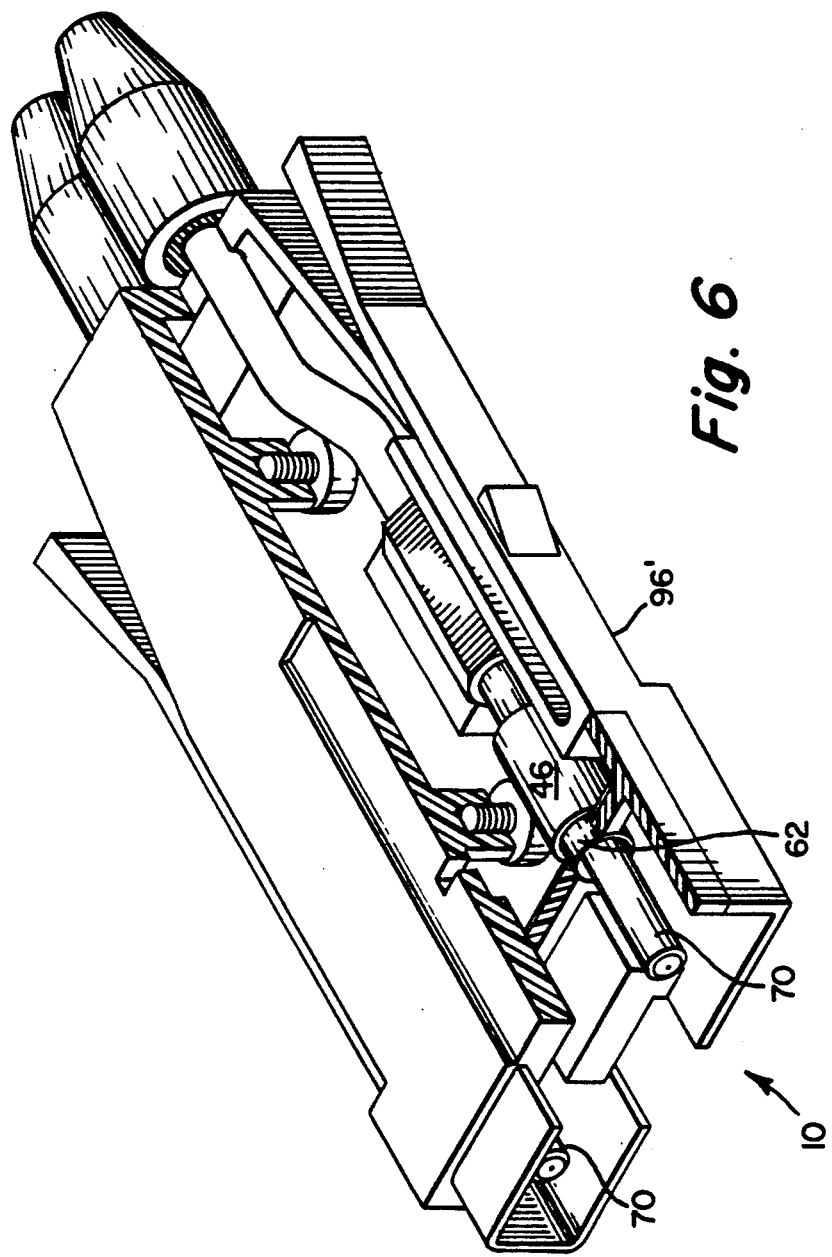
FIG. 6 is a fragmentary, isometric view of an FDDI style fiber-optic connector which utilizes a pair of the fiber-optic connectors made according to the present invention.

The connector 10 is presently designed for use with the ST, SC, FCPC and DIN 47256 connector styles shown in FIG. 5, and the FDDI connector style shown in FIG. 6. The latter connector comprises a connector 10 with a pair of connector base assemblies having the design of the present invention with appropriately styled bodies 46 and a coupling housing 96' which serves the function of a coupling nut.

The connector 10 of the present invention achieves a universal design by using components for the connector base assembly which accommodate the body 46 and nut 96 designs of multiple styles. As such, only the body and nut need be changed when changing from one connector style to another of the multiple available styles. To provide such interchangeability, the connector 10 must be designed with a body 46 having an outside diameter of a size no larger than the size of the connector style requiring the smallest diameter body for the diameter size of the ferrule 70 to be used. While the connector 10 has a universal design which accommodates many connector styles, the sizing must be based upon the particular diameter ferrule 70 which has been selected for use and previously attached to the optic fiber 20 of the fiber-optic cable 12. Typical ferrule diameters are 2.0 mm. and 2.5 mm., although the connector 10 of the present invention can be used with other diameter ferrules.

To provide interchangeability, it is also necessary that the particular connector styles which are to be interchanged on the connector base assembly will have an adequate exposed length of the ferrule 70. Thus, the ferrule 70 must be selected with a length no shorter than required to provide an exposed ferrule length for the connector style requiring the longest exposed ferrule length. The ferrule length and, as discussed above, the body outside diameter must be selected such that both will be satisfactorily sized for every connector style which is to be interchangeable on the connector base assembly.

The universal design of connector 10 of the present invention provides many advantages. The user need stock a much smaller variety of connector parts, since all style connectors use common parts except for the bodies and nuts required for the different connector styles which are to be interchangeable. The resulting reduction in required parts inventory is a substantial advantage.

A further advantage of the connector 10 of the present invention is that the user of a variety of connector styles only needs to train personnel on installation of a single design connector to the fiber-optic cable 12. Since the connector base assembly of the connector 10 is common to all connector styles, the installer does not have to learn a different installation procedure for each style of connector. This improves the efficiency of the installer, who must attached the connector to the fiber-optic cable, and thus reduces installation costs.

Of course, by being able to quickly and easily switch from one connector style to another by simply removing the body 46 and coupling nut 96 of one style with the body and coupling nut of another style without discarding or even changing the connector base assembly, the cost for changing to a new style is significantly reduced. At present, no such universal connector is available, and users that want to switch from one connector style to another must simply cut the old connector from the fiber-optic cable and attach an entirely new connector with the desired style. This is an expensive process in terms of the parts and labor involved, and the system downtime that results.

Another aspect of the present invention involves a more secure antirotation arrangement for the second backpost 62. The second backpost rearward portion 66 has a square cross-section as best shown in FIG. 3, and the interior portion 43 of the first backpost central passageway 28 has a corresponding square cross-section sized to receive the second backpost rearward portion therein. Since both the second backpost rearward portion 66 and the first backpost interior portion 43 have mating non-cylindrical shapes, the second backpost 62 is permitted to move longitudinally relative to the first backpost 22, but rotational movement therebetween is prevented.

In accordance with the present invention, the second backpost rearward portion 66 has sufficient length so that it will be positioned within the first backpost interior portion 43 to prevent rotational movement between the first and second backposts 22 and 62 prior to and during the time that the body interior-threaded portion 50 is being threaded onto the first backpost exteriorly threaded forward portion 24 during assembly and disassembly of the connector 10. The problem of unintentional rotation of the second backpost and damaging of the optic fiber is thereby eliminated. For example, upon initial installation of the connector 10 on the fiber-optic cable 12, there is a reliable lock of the second backpost 62 against rotating relative to the first backpost 22 when the body 46 is rotated.

In prior art designs, the second backpost can sometimes rotate with respect to the first backpost when the body is threaded onto the first backpost, such as during initial installation before the epoxy cement completely cures to provide a secure attachment between the second backpost and the bare optic fiber and the buffered portion of the optic fiber. If such rotation does occur, it can result in the ferrule scoring or nicking the optic fiber.

It is noted that the sequence of assembly of the body 46 on the first backpost 22 is to threadably engage the second backpost exteriorly threaded portion 78 with the body interiorly threaded portion 50 and rotate the body relative to the second backpost 62 until the second backpost exterior threads 80 pass by the interior body threads 54 and move within the body central passageway 52. With the second backpost 62 so positioned within the body 46, the body interiorly threaded portion 50 is then threaded onto the first backpost exteriorly threaded portion 24. Since the second backpost rearward portion 66 has sufficient length such that it will already be inserted within the first backpost central passageway 28 and be held against rotation well before the body interiorly threaded portion 50 engages the first backpost exteriorly threaded portion 24, the problem of rotating the body 46 causing the second backpost 62 to rotate and damage the optic fiber 20 cannot occur with the present invention.

It will be appreciated that, although a specific embodiment of the invention has been described herein for purposes of illustration, various modifications may be made without departing from the spirit and scope of the invention. Accordingly, the invention is not limited except as by the appended claims.

We claim:

1. A fiber-optic connector for a cable with an optic fiber, comprising:
   a ferrule having a central passageway extending generally longitudinally fully through said ferrule to receive the optic fiber;
   an elongated first backpost having an exteriorly threaded forward end portion, a rearward end portion attachable to the cable, and a central passageway extending generally longitudinally fully through said first backpost to receive the optic fiber, said first backpost exteriorly threaded portion having threads with a first pitch diameter and a first thread pitch, and said first backpost central passageway having a forward opening at said first backpost forward portion;
   a body having a forward end portion, an interiorly threaded rearward end portion, and a central passageway extending generally longitudinally fully through said body, said body interiorly threaded portion having threads with said first pitch diameter, said first thread pitch and an interior thread diameter, said first backpost exteriorly threaded portion being threadably received by said body interiorly threaded portion, said body central passageway having a forward opening at said body forward portion defined by a shoulder which projects radially inward and a rearward opening at said body rearward portion;
   an elongated second backpost positioned within said body central passageway and having forward and rearward end portions, said second backpost rearward portion extending rearwardly through said body rearward opening and into said first backpost forward opening, said second backpost forward portion terminating in a forwardly opening recess sized to receive and hold said ferrule in generally longitudinal alignment with said second backpost, said second backpost forward portion being disposed within said body central passageway for longitudinal movement of said second backpost relative to said body and having an outer dimension generally equal to or less than said body interior thread diameter to freely pass by said body interior threads when said second backpost is inserted within said body central passageway during assembly of the connector, and said second backpost rearward portion being disposed within said first backpost central passageway for longitudinal movement of said second backpost relative to said first backpost, said first backpost central passageway and said body central passageway having a combined longitudinal length to permit forward and rearward longitudinal movement of said second backpost therewithin, said second backpost further having an exteriorly threaded central portion positioned between said second backpost forward and rearward portions, and a central passageway extending generally longitudinally fully through said second backpost to receive the optic fiber, said second backpost exteriorly threaded portion having threads with said first pitch diameter and said first thread pitch to allow said second backpost exterior threads to threadably engage and upon rotation pass by said body interior threads when said second backpost is inserted within said body central passageway during assembly of the connector prior to said body interiorly threaded portion threadably receiving said first backpost exteriorly threaded portion, said body shoulder projecting radially inward sufficient to limit forward longitudinal movement of said second backpost within said first backpost and body central passageways;
   a spring positioned within said body about said second backpost rearward portion and between said first backpost forward portion and said second backpost central portion to bias said second backpost forwardly relative to said first backpost; and
   a coupling member mounted to said body.

2. A fiber-optic connector for a cable with an optic fiber, comprising:
   a ferrule having a central passageway extending generally longitudinally fully through said ferrule to receive the optic fiber;
   an elongated first backpost having an exteriorly threaded forward end portion, a rearward end portion attachable to the cable, and a central passageway extending generally longitudinally fully through said first backpost to receive the optic fiber, said first backpost exteriorly threaded portion having threads with a first pitch diameter and a first thread pitch, and said first backpost central passageway having a forward opening at said first backpost forward portion;
   a generally cylindrical body having a forward end portion, an interiorly threaded rearward end portion, and a central passageway extending generally longitudinally fully through said body, said body interiorly threaded portion having threads with said first pitch diameter, said first thread pitch and an interior thread diameter, said first backpost exteriorly threaded portion being threadably received by said body interiorly threaded portion to hold said body and said first backpost in substantial coaxial alignment, said body central passageway having a forward opening at said body forward portion defined by a shoulder which projects radially inward and a rearward opening at said body rearward portion;

an elongated second backpost positioned within said body central passageway and having forward and rearward end portions, said second backpost rearward portion extending rearwardly through said body rearward opening and into said first backpost forward opening, said second backpost forward portion engaging and holding said ferrule in generally longitudinal alignment with said second backpost, said second backpost forward portion being disposed within said body central passageway for longitudinal movement of said second backpost relative to said body and having an outer dimension generally equal to or less than said interior thread diameter to freely pass by said body interior threads when said second backpost is inserted within said body central passageway during assembly of the connector, and said second backpost rearward portion being disposed within said first backpost central passageway for longitudinal movement of said second backpost relative to said first backpost, said first backpost central passageway and said body central passageway having a combined longitudinal length to permit forward and rearward longitudinal movement of said second backpost therewithin, said second backpost further having an exteriorly threaded central portion positioned between said second backpost forward and rearward portions, said second backpost exteriorly threaded portion having threads with said first pitch diameter and said first thread pitch to allow said second backpost exterior threads to threadably engage and upon rotation pass by said body interior threads when said second backpost is inserted within said body central passageway during assembly of the connector prior to said body interiorly threaded portion threadably receiving said first backpost exteriorly threaded portion, said body shoulder projecting radially inward sufficient to limit forward longitudinal movement of said second backpost within said first backpost and body central passageways, said second backpost further having a central passageway extending generally longitudinally fully through said second backpost to receive the optic fiber, said second backpost being maintained within said body in substantial coaxial alignment with said first backpost with said first backpost central passageway and said second backpost central passageway in substantial coaxial alignment;

a spring positioned within said body about said second backpost rearward portion and between said first backpost forward portion and said second backpost central portion to bias said second backpost forwardly relative to said first backpost; and a coupling member rotatably mounted to said body.

3. A fiber-optic connector for a cable with an optic fiber, comprising:

a ferrule having a central passageway extending generally longitudinally fully through said ferrule to receive the optic fiber;

an elongated first backpost having an exteriorly threaded forward end portion, a rearward end portion attachable to the cable, and a central passageway extending generally longitudinally fully through said first backpost to receive the optic fiber, said first backpost exteriorly threaded portion having threads with a first pitch diameter and a first thread pitch, and said first backpost central passageway having a forward opening at said first backpost forward portion and having a non-cylindrical interior wall portion positioned toward said first backpost forward opening;

a body having a forward end portion, an interiorly threaded rearward end portion, and a central passageway extending generally longitudinally fully through said body, said body interiorly threaded portion having threads with said first pitch diameter, said first thread pitch and an interior thread diameter, said first backpost exteriorly threaded portion being threadably received by said body interiorly threaded portion, said body central passageway having a forward opening at said body forward portion defined by a shoulder which projects radially inward and a rearward opening at said body rearward portion;

an elongated second backpost positioned within said body central passageway and having forward and rearward end portions, said second backpost rearward portion extending rearwardly through said body rearward opening and into said first backpost forward opening, said second backpost rearward portion having a non-cylindrical interior wall portion which extends within and mates with said first backpost non-cylindrical interior wall portion to permit longitudinal movement of said second backpost relative to said first backpost while preventing rotational movement therebetween, said second backpost rearward portion having sufficient length to position said second backpost non-cylindrical exterior wall portion within said first backpost non-cylindrical interior wall portion to prevent rotational movement therebetween prior to and when said body interiorly threaded rearward portion is being threaded onto said first backpost exteriorly threaded portion during assembly of the connector, said second backpost forward portion terminating in a forwardly opening recess sized to receive and hold said ferrule in generally longitudinal alignment with said second backpost, said second backpost forward portion being disposed within said body central passageway for longitudinal movement of said second backpost relative to said body and having an outer dimension generally equal to or less than said interior thread diameter to freely pass by said body interior threads when said second backpost is inserted within said body central passageway during assembly of the connector, and said second backpost rearward portion being disposed within said first backpost central passageway for longitudinal movement of said second backpost relative to said first backpost, said first backpost central passageway and said body central passageway having a combined longitudinal length to permit forward and rearward longitudinal movement of said second backpost therewithin, said second backpost further having an exteriorly threaded central portion positioned between said second backpost forward and rearward portions, and a central passageway extending generally longitudinally fully through said second backpost to receive the optic fiber, said second backpost exteriorly threaded portion having threads with said first pitch diameter and said first thread pitch to allow said second backpost exterior threads to threadably engage and upon rotation pass by said body interior threads when said second backpost is inserted within said body central passageway during assembly of the connector prior to said body interiorly threaded portion threadably receiving said first backpost exteriorly threaded portion, said body shoulder projecting radially inward sufficient to limit forward longitudinal movement of said second backpost within said first backpost and body central passageways;

a spring positioned within said body about said second backpost rearward portion and between said first backpost forward portion and said second backpost central portion to bias said second backpost forwardly relative to said first backpost; and a coupling member mounted to said body.

4. The fiber-optic connector of claim 3 wherein said first backpost central passageway has a rearward passageway portion which extends forward from a rearward end of said first backpost to a midportion of said first backpost passageway and a forward passageway portion which extends rearward from a forward end of said first backpost to said midportion, said rearward passageway portion having a diameter sized to receive and provide lateral support to the optic fiber, and said forward passageway portion having a diameter larger than the diameter of said rearward passageway portion and sized to receive and permit longitudinal movement of said second backpost rearward portion therein, said forward passageway portion having a longitudinal length sized substantially equal to the length necessary for movement of said second backpost rearward portion to permit the desired compression of said spring by rearward movement of said second backpost during usage of the connector.

5. The fiber-optic connector of claim 3 for use with the optic fiber having a buffer, wherein said second backpost rearward portion has a rearward end, and said first backpost central passageway has a forward passageway portion and a rearward passageway portion, said rearward passageway portion having a diameter sized to receive and provide lateral support to a length of the optic fiber covered with the buffer, and said forward passageway portion having a diameter larger than the diameter of said rearward passageway portion and sized to receive and permit longitudinal movement of said second backpost rearward portion therein, said forward and rearward passageway portions having a forward facing annular shoulder extending therebetween, said second backpost rearward portion having a longitudinal length sufficient to position said rearward end thereof at a longitudinal distance from said shoulder when the connector is assembled and said spring biasing said second backpost fully forward which is equal to or less than five times the outside diameter of the buffered optic fiber.

6. A fiber-optic connector for a cable with an optic fiber, comprising:

a ferrule having a central passageway extending generally longitudinally fully through said ferrule to receive the optic fiber;

an elongated first backpost having an exteriorly threaded forward end portion, a rearward end portion attachable to the cable, and a central passageway extending generally longitudinally fully through said first backpost to receive the optic fiber, said first backpost exteriorly threaded portion having threads with a first pitch diameter and a first thread pitch, and said first backpost central passageway having a forward opening at said first backpost forward portion and having an interior wall portion positioned toward said first backpost forward opening;

a body having a forward end portion, an interiorly threaded rearward end portion, and a central passageway extending generally longitudinally fully through said body, said body interiorly threaded portion having threads with said first pitch diameter, said first thread pitch and an interior thread diameter, said first backpost exteriorly threaded portion being threadably received by said body interiorly threaded portion, said body central passageway having a forward opening at said body forward portion defined by a shoulder which projects radially inward and a rearward opening at said body rearward portion;

an elongated second backpost positioned within said body central passageway and having forward and rearward end portions, said second backpost rearward portion extending rearwardly through said body rearward opening and into said first backpost forward opening, said second backpost rearward portion having an exterior wall portion which extends within and engages said first backpost interior wall portion to permit longitudinal movement of said second backpost relative to said first backpost while preventing rotational movement therebetween, said second backpost rearward portion having sufficient length to position said second backpost interior wall portion within said first backpost exterior wall portion to prevent rotational movement therebetween prior to and when said body interiorly threaded rearward portion is being threaded onto said first backpost exteriorly threaded portion during assembly of the connector, said second backpost forward portion terminating in a forwardly opening recess sized to receive and hold said ferrule in generally longitudinal alignment with said second backpost, said second backpost forward portion being disposed within said body central passageway for longitudinal movement of said second backpost relative to said body and having an outer dimension generally equal to or less than said interior thread diameter to freely pass by said body interior threads when said second backpost is inserted within said body central passageway during assembly of the connector, and said second backpost rearward portion being disposed within said first backpost central passageway for longitudinal movement of said second backpost relative to said first backpost, said first backpost central passageway and said body central passageway having a combined longitudinal length to permit forward and rearward longitudinal movement of said second backpost therewithin, said second backpost further having an exteriorly threaded central portion positioned between said second backpost forward and rearward portions, and a central passageway extending generally longitudinally fully through said second backpost to receive the optic fiber, said second backpost exteriorly threaded portion having threads with said first pitch diameter and said first thread pitch to allow said second backpost exterior threads to threadably engage and upon rotation pass by said body interior threads when said second backpost is inserted within said central passageway during assembly of the connector prior to said body interiorly threaded portion threadably receiving said first backpost exteriorly threaded portion, said body shoulder projecting radially inward sufficient to limit forward longitudinal movement of said second backpost within said first backpost and body central passageways;

a spring positioned within said body about said second backpost rearward portion and between said first backpost forward portion and said second backpost central portion to bias said second backpost forwardly relative to said first backpost; and a coupling member mounted to said body.

7. The fiber-optic connector of claim 6 wherein said first backpost central passageway has a rearward passageway portion which extends forward from a rearward end of said first backpost to a midportion of said first backpost passageway and a forward passageway portion which extends rearward from a forward end of said first backpost to said midportion, said rearward passageway portion having a diameter sized to receive and provide lateral support to the optic fiber, and said forward passageway portion having a diameter larger than the diameter of said rearward passageway portion and sized to receive and permit longitudinal movement of said second backpost rearward portion therein, said forward passageway portion having a longitudinal length sized substantially equal to the length necessary for movement of said second backpost rearward potion to permit the desired compression of said spring by rearward movement of said second backpost during usage of the connector.

8. The fiber-optic connector of claim 6 for use with the optic fiber having a buffer, wherein said second backpost rearward portion has a rearward end, and said first backpost central passageway has a forward passageway portion and a rearward passageway portion, said rearward passageway portion having a diameter sized to receive and provide lateral support to a length of the optic fiber covered with the buffer, and said forward passageway portion having a diameter larger than the diameter of said rearward passageway portion and sized to receive and permit longitudinal movement of said second backpost rearward portion therein, said forward and rearward passageway portions having a forward facing annular shoulder extending therebetween, said second backpost rearward portion having a longitudinal length sufficient to position said rearward end thereof at a longitudinal distance from said shoulder when the connector is assembled and said spring biasing said second backpost fully forward which is equal to or less than five times the outside diameter of the buffered optic fiber.

9. A fiber-optic connector for a cable with an optic fiber having a buffer, comprising:

a ferrule having a central passageway extending generally longitudinally fully through said ferrule to receive the optic fiber;

an elongated first backpost having a forward end portion, a rearward end portion attachable to the cable, and a central passageway extending generally longitudinally fully through said first backpost to receive the optic fiber, said first backpost central passageway having a forward opening at said first backpost forward portion, said first backpost central passageway having a rearward passageway portion which extends forward from a rearward end of said first backpost to a midportion of said first backpost passageway and a forward passageway portion which extends rearward from a forward end of said first backpost to said midportion, said rearward passageway portion having a diameter sized to receive and provide lateral support to the optic fiber;

a body having a forward end portion, a rearward end portion, and a central passageway extending generally longitudinally fully through said body, said body rearward portion being removably attached to said first backpost forward portion, said body central passageway having a forward opening at said body forward portion defined by a shoulder which projects radially inward and a rearward opening at said body rearward portion;

an elongated second backpost positioned within said body central passageway and having forward and rearward end portions, said second backpost rearward portion extending rearwardly through said body rearward opening and into said first backpost forward opening, said second backpost forward portion terminating in a forwardly opening recess sized to receive and hold said ferrule in generally longitudinal alignment with said second backpost, said second backpost forward portion being disposed within said body central passageway for longitudinal movement of said second backpost relative to said body, said second backpost rearward portion being disposed within said forward passageway portion of said first backpost central passageway for longitudinal movement of said second backpost relative to said first backpost, said first backpost central passageway and said body central passageway having a combined longitudinal length to permit forward and rearward longitudinal movement of said second backpost therewithin, said forward passageway portion of said first backpost central passageway having a diameter larger than the diameter of said rearward passageway portion and sized to receive and permit longitudinal movement of said second backpost rearward portion therein, said second backpost further having a central portion positioned between said second backpost forward and rearward portions, and a central passageway extending generally longitudinally fully through said second backpost to receive the optic fiber, said body shoulder projecting radially inward sufficient to limit forward longitudinal movement of said second backpost within said first backpost and body central passageways;

a spring positioned within said body about said second backpost rearward portion and between said first backpost forward portion and said second backpost central portion to bias said second backpost forwardly relative to said first backpost, said forward passageway portion of said first backpost central passageway having a longitudinal length sized substantially equal to the length necessary for movement of said second backpost rearward portion to permit the desired compression of said spring by rearward movement of said second backpost during usage of the connector; and a coupling member mounted to said body.

10. A fiber-optic connector for a cable with an optic fiber, comprising:

a ferrule having a central passageway extending generally longitudinally fully through said ferrule to receive the optic fiber;

an elongated first backpost having a forward end portion, a rearward end portion attachable to the cable, and a central passageway extending generally longitudinally fully through said first backpost to receive the optic fiber, said first backpost central passageway having a forward opening at said first backpost forward portion, said first backpost central passageway having a forward passageway portion and a rearward passageway portion, said rearward passageway portion having a diameter sized to receive and provide lateral support to a length of the optic fiber covered with the buffer;

a body having a forward end portion, a rearward end portion, and a central passageway extending generally longitudinally fully through said body, said body rearward portion being removably attached to said first backpost forward portion, said body central passageway having a forward opening at said body forward portion defined by a shoulder which projects radially inward and a rearward opening at said body rearward portion;

an elongated second backpost positioned within said body central passageway and having forward and rearward end portions, said second backpost rearward portion extending rearwardly through said body rearward opening and into said first backpost forward opening, said second backpost forward portion terminating in a forwardly opening recess sized to receive and hold said ferrule in generally longitudinal alignment with said second backpost, said second backpost forward portion being disposed within said body central passageway for longitudinal movement of said second backpost relative to said body, said second backpost rearward portion having a rearward end and being disposed within said forward passageway portion of said first backpost central passageway for longitudinal movement of said second backpost relative to said first backpost, said first backpost central passageway and said body central passageway having a combined longitudinal length to permit forward and rearward longitudinal movement of said second backpost therewithin, said forward passageway portion of said first backpost central passageway having a diameter larger than the diameter of said rearward passageway portion and sized to receive and permit longitudinal movement of said second backpost rearward portion therein, said second backpost further having a central portion positioned between said second backpost forward and rearward portions, and a central passageway extending generally longitudinally fully through said second backpost to receive the optic fiber, said body shoulder projecting radially inward sufficient to limit forward longitudinal movement of said second backpost within said first backpost and body central passageways;

a spring positioned within said body about said second backpost rearward portion and between said first backpost forward portion and said second backpost central portion to bias said second backpost forwardly relative to said first backpost, said second backpost rearward portion having a longitudinal length sufficient to position said rearward end thereof at a longitudinal distance from said shoulder of said first backpost when the connector is assembled and said spring biasing said second backpost fully forward which is equal to or less than five times the outside diameter of the buffered optic fiber; and a coupling member mounted to said body.

11. A fiber-optic connector for a cable with an optic fiber, comprising:

a ferrule having a central passageway extending generally longitudinally fully through said ferrule to receive the optic fiber;

an elongated first backpost having a forward end portion, a rearward end portion attachable to the cable, and a central passageway extending generally longitudinally fully through said first backpost to receive the optic fiber, said first backpost central passageway having a forward opening at said first backpost forward portion and having a non-cylindrical interior wall portion positioned toward said first backpost forward opening;

a body having a forward end portion, a rearward end portion, and a central passageway extending generally longitudinally fully through said body, said body rearward portion being removably attached to said first backpost forward portion, said body central passageway having a forward opening at said body forward portion defined by a shoulder which projects radially inward and a rearward opening at said body rearward portion;

an elongated second backpost positioned within said body central passageway and having forward and rearward end portions, said second backpost rearward portion extending rearwardly through said body rearward opening and into said first backpost forward opening, said second backpost rearward portion having a non-cylindrical exterior wall portion which extends within and mates with said first backpost non-cylindrical interior wall portion to permit longitudinal movement of said second backpost relative to said first backpost while preventing rotational movement therebetween, said second backpost rearward portion having sufficient length to position said second backpost non-cylindrical exterior wall portion within said first backpost non-cylindrical interior wall portion to prevent rotational movement therebetween prior to and when said body rearward portion is being attached to said first backpost forward portion during assembly of the connector, said second backpost forward portion terminating in a forwardly opening recess sized to receive and hold said ferrule in generally longitudinal alignment with said second backpost, said second backpost forward portion being disposed within said body central passageway for longitudinal movement of said second backpost relative to said body, said second backpost rearward portion being disposed within said first backpost central passageway for longitudinal movement of said second backpost relative to said first backpost, said first backpost central passageway and said body central passageway having a combined longitudinal length to permit forward and rearward longitudinal movement of said second backpost therewithin, said second backpost further having a central portion positioned between said second backpost forward and rearward portions, and a central passageway extending generally longitudinally fully through said second backpost to receive the optic fiber, said body shoulder projecting radially inward sufficient to limit forward longitudinal movement of said second backpost within said first backpost and body central passageways;

a spring positioned within said body about said second backpost rearward portion and between said first backpost forward portion and said second backpost central portion to bias said second backpost forwardly relative to said first backpost; and a coupling member mounted to said body.

12. A fiber-optic connector for a cable with an optic fiber, comprising:

a ferrule having a central passageway extending generally longitudinally fully through said ferrule to receive the optic fiber;

an elongated first backpost having an exteriorly threaded forward end portion, a rearward end portion attachable to the cable, and a central passageway extending generally longitudinally fully through said first backpost to receive the optic fiber, said first backpost exteriorly threaded portion having threads with a first pitch diameter and a first thread pitch, and said first backpost central passageway having a forward opening at said first backpost forward portion;

a body having a forward end portion, an interiorly threaded rearward end portion, and a central passageway extending generally longitudinally fully through said body, said body interiorly threaded portion having threads with said first pitch diameter, said first thread pitch and an interior thread diameter, said first backpost exteriorly threaded portion being threadably received by said body interiorly threaded portion, said body central passageway having a forward opening at said body forward portion defined by a shoulder which projects radially inward and a rearward opening at said body rearward portion;

an elongated second backpost positioned within said body central passageway and having a forward end portion extending forwardly through said body forward opening and a rearward end portion extending rearwardly through said body rearward opening and into said first backpost forward opening, said second backpost forward portion terminating in a forwardly opening recess sized to receive and hold said ferrule in generally longitudinal alignment with said second backpost, said second backpost forward portion being disposed within said body forward opening for longitudinal movement of said second backpost relative to said body and having an outer dimension generally equal to or less than said interior thread diameter to freely pass by said body interior threads when said second backpost is inserted within said body central passageway during assembly of the connector, and said second backpost rearward portion being disposed within said first backpost central passageway for longitudinal movement of said second backpost relative to said first backpost, said first backpost central passageway and said body central passageway having a combined longitudinal length to permit forward and rearward longitudinal movement of said second backpost therewithin, said second backpost further having an exteriorly threaded central portion positioned between said second backpost forward and rearward portions, and a central passageway extending generally longitudinally fully through said second backpost to receive the optic fiber, said second backpost exteriorly threaded portion having threads with said first pitch diameter and said first thread pitch to allow said second backpost exterior threads to threadably engage and upon rotation pass by said body interior threads when said second backpost is inserted within said body central passageway during assembly of the connector prior to said body interiorly threaded portion threadably receiving said first backpost exteriorly threaded portion, said body shoulder projecting radially inward sufficient to engage said second backpost threads and limit forward longitudinal movement of said second backpost within said first backpost and body central passageways;

a spring positioned within said body about said second backpost rearward portion and between said first backpost forward portion and said second backpost central portion to bias said second backpost forwardly relative to said first backpost; and a coupling member having a forward end portion, a rearward end portion and a central passageway extending generally longitudinally fully through said member, said member central passageway receiving said body therewithin with said ferrule extending forwardly through a forward opening of said member and said first backpost extending rearwardly through a rearward opening of said member, said member being freely rotatable relative to said body and said first backpost.

13. A fiber-optic connector for a cable with an optic fiber, comprising:

a ferrule having a central passageway extending generally longitudinally fully through said ferrule to receive the optic fiber;

an elongated first backpost having an exteriorly threaded forward end portion, a rearward end portion attachable to the cable, and a central passageway extending generally longitudinally fully through said first backpost to receive the optic fiber, said first backpost exteriorly threaded portion having threads with a first pitch diameter and a first thread pitch, and said first backpost central passageway having a forward opening at said first backpost forward portion;

a generally cylindrical body having a forward end portion, an interiorly threaded rearward end portion, and a central passageway extending generally longitudinally fully through said body, said body interiorly threaded portion having threads with said first pitch diameter, said first thread pitch and an interior thread diameter, said first backpost exteriorly threaded portion being threadably received by said body interiorly threaded portion to hold said body and said first backpost in substantial coaxial alignment, said body central passageway having a forward opening at said body forward portion defined by a shoulder which projects radially inward and a rearward opening at said body rearward portion;

an elongated second backpost positioned within said body central passageway and having a forward end portion extending forwardly through said body forward opening and a rearward end portion extending rearwardly through said body rearward opening and into said first backpost forward opening, said second backpost forward portion engaging and holding said ferrule in generally longitudinal alignment with said second backpost, said second backpost forward portion being disposed within said body forward opening for longitudinal movement of said second backpost relative to said body and having an outer dimension generally equal to or less than said interior thread diameter to freely pass by said body interior threads when said second backpost is inserted within said body central passageway during assembly of the connector, and said second backpost rearward portion being disposed within said first backpost central passageway for longitudinal movement of said second backpost relative to said first backpost, said first backpost central passageway and said body central passageway having a combined longitudinal length to permit forward and rearward longitudinal movement of said second backpost therewithin, said second backpost further having an exteriorly threaded central portion positioned between said second backpost forward and rearward portions, said second backpost exteriorly threaded portion having threads with said first pitch diameter and said first thread pitch to allow said second backpost exterior threads to threadably engage and upon rotation pass by said body interior threads when said second backpost is inserted within said body central passageway during assembly of the connector prior to said body interiorly threaded portion threadably receiving said first backpost exteriorly threaded portion, said body shoulder projecting radially inward sufficient to engage a forward end portion of said second backpost threads and limit forward longitudinal movement of said second backpost within said first backpost and body central passageways, said second backpost further having a central passageway extending generally longitudinally fully through said second backpost to receive the optic fiber, said second backpost being maintained within said body in substantial coaxial alignment with said first backpost with said first backpost central passageway and said second backpost central passageway in substantial coaxial alignment;

a spring positioned within said body about said second backpost rearward portion and between said first backpost forward portion and said second backpost central portion to bias said second backpost forwardly relative to said first backpost; and a coupling member having a forward end portion, a rearward end portion and a central passageway extending generally longitudinally fully through said member, said member central passageway receiving said body therewithin with said ferrule extending forwardly through a forward opening of said member and said first backpost extending rearwardly through a rearward opening of said member, said member being freely rotatable relative to said body and said first backpost.

14. A method of assembling a fiber-optic cable having an optic fiber with a fiber-optic connector of one style which can be subsequently changed when desired to one of a plurality of additional styles without detaching the optic fiber or the cable components from the connector, comprising:

providing a ferrule having a central passageway extending generally longitudinally fully through said ferrule to receive the optic fiber, said ferrule having a length at least as long as required for the connector style requiring the longest exposed ferrule;

providing an elongated first backpost having an exteriorly threaded forward end portion, a rearward end portion attachable to the cable, and a central passageway extending generally longitudinally fully through said first backpost to receive the optic fiber, said first backpost exteriorly threaded portion having threads with a first pitch diameter and a first thread pitch, and said first backpost central passageway having a forward opening at said first backpost forward portion;

providing a plurality of bodies, each body having a forward end portion, an interiorly threaded rearward end portion, and a central passageway extending generally longitudinally fully through said body, said body interiorly threaded portion having threads with said first pitch diameter, said first thread pitch and an interior thread diameter, said first backpost exteriorly threaded portion being threadably received by said body interiorly threaded portion, said body central passageway having a forward opening at said body forward portion defined by a shoulder which projects radially inward and a rearward opening at said body rearward portion;

providing an elongated second backpost positioned within said body central passageway and having forward and rearward end portions, said second backpost rearward portion extending rearwardly through said body rearward opening and into said first backpost forward opening, said second backpost forward portion terminating in a forwardly opening recess sized to receive and hold said ferrule in generally longitudinal alignment with said second backpost, said second backpost forward portion being disposed within said body central passageway for longitudinal movement of said second backpost relative to said body and having an outer dimension generally equal to or less than said interior thread diameter to freely pass by said body interior threads when said second backpost is inserted within said body central passageway during assembly of the connector, and said second backpost rearward portion being disposed within said first backpost central passageway for longitudinal movement of said second backpost relative to said first backpost, said first backpost central passageway and said body central passageway having a combined longitudinal length to permit forward and rearward longitudinal movement of said second backpost therewithin, said second backpost further having an exteriorly threaded central portion positioned between said second backpost forward and rearward portions, and a central passageway extending generally longitudinally fully through said second backpost to receive the optic fiber, said second backpost exteriorly threaded portion having threads with said first pitch diameter and said first thread pitch to allow said second backpost exterior threads to threadably engage and upon rotation pass by said body interior threads when said second backpost is inserted within said body central passageway during assembly of the connector prior to said body interiorly threaded portion threadably receiving said first backpost exteriorly threaded portion, said body shoulder projecting radially inward sufficient to limit forward longitudinal movement of said second backpost within said first backpost and body central passageways;

providing a spring positioned within said body about said second backpost rearward portion and between said first backpost forward portion and said second backpost central portion to bias said second backpost forwardly relative to said first backpost;

providing a plurality of different style coupling members, each member being mounted to one of said plurality of bodies;

attaching said first backpost rearward portion to an end of the cable;

extending the optic fiber through said first backpost central passageway, said second backpost central passageway and said ferrule central passageway, and fixedly securing said optic fiber against removal from at least said ferrule central passageway;

assembling the connector using an initial selected style coupling member of said plurality of coupling members and using a corresponding initial one of said bodies; and after the connector is initially fully assembled and it is desired to change to a selected different style coupling member of said plurality of coupling members, disconnecting said initial coupling member and initial body from the assembled connector by threadably removing said initial body from said first and second backposts, and then connecting said different style coupling member and corresponding body to the connector by threadably attaching said corresponding body with said different style coupling member mounted thereto without removing the secured optic fiber from said first backpost central passageway, said second backpost central passageway or said ferrule central passageway.

15. A method of assembling a fiber-optic cable having an optic fiber with a fiber-optic connector of one style which can be subsequently changed when desired to one of a plurality of additional styles without detaching the optic fiber or the cable components from the connector, comprising:

providing a ferrule having a central passageway extending generally longitudinally fully through said ferrule to receive the optic fiber, said ferrule having a length at least as long as required for the connector style requiring the longest exposed ferrule;

providing an elongated first backpost having a forward end portion, a rearward end portion attachable to the cable, and a central passageway extending generally longitudinally fully through said first backpost to receive the optic fiber, said first backpost central passageway having a forward opening at said first backpost forward portion;

providing a plurality of bodies, each body having a forward end portion, a rearward end portion, and a central passageway extending generally longitudinally fully through said body, said body rearward portion being removably attached to said first backpost forward portion, said body central passageway having a forward opening at said body forward portion defined by a shoulder which projects radially inward and a rearward opening at said body rearward portion;

providing an elongated second backpost positioned within said body central passageway and having forward and rearward end portions, said second backpost rearward portion extending rearwardly through said body rearward opening and into said first backpost forward opening, said second backpost forward portion terminating in a forwardly opening recess sized to receive and hold said ferrule in generally longitudinal alignment with said second backpost, said second backpost forward portion being disposed within said body central passageway for longitudinal movement of said second backpost relative to said body, said second backpost rearward portion being disposed within said first backpost central passageway for longitudinal movement of said second backpost relative to said first backpost, said first backpost central passageway and said body central passageway having a combined longitudinal length to permit forward and rearward longitudinal movement of said second backpost therewithin, said second backpost further having a central portion positioned between said second backpost forward and rearward portions, and a central passageway extending generally longitudinally fully through said second backpost to receive the optic fiber, said body shoulder projecting radially inward sufficient to limit forward longitudinal movement of said second backpost within said first backpost and body central passageways;

providing a spring positioned within said body about said second backpost rearward portion and between said first backpost forward portion and said second backpost central portion to bias said second backpost forwardly relative to said first backpost;

providing a plurality of different style coupling members, each member being mounted to one of said plurality of bodies;

attaching said first backpost rearward portion to an end of the cable;

extending the optic fiber through said first backpost central passageway, said second backpost central passageway and said ferrule central passageway, and fixedly securing said optic fiber against removal from at least said ferrule central passageway;

assembling the connector using an initial selected style coupling member of said plurality of coupling members and using a corresponding initial one of said bodies; and after the connector is initially fully assembled and it is desired to change to a selected different style coupling member of said plurality of coupling members, disconnecting said initial coupling member and initial body from the assembled connector and then connecting said different style coupling member and corresponding body to the connector without removing the secured optic fiber from said first backpost central passageway, said second backpost central passageway or said ferrule central passageway.

* * * * *